Feb. 24, 1970   J. H. OBERHEUSER   3,497,289

PRISM VARIABLE ANAMORPHIC OPTICAL SYSTEM

Filed Sept. 25, 1967   3 Sheets-Sheet 1

JOSEPH H. OBERHEUSER
INVENTOR.

BY *Frank C. Parker*

ATTORNEY

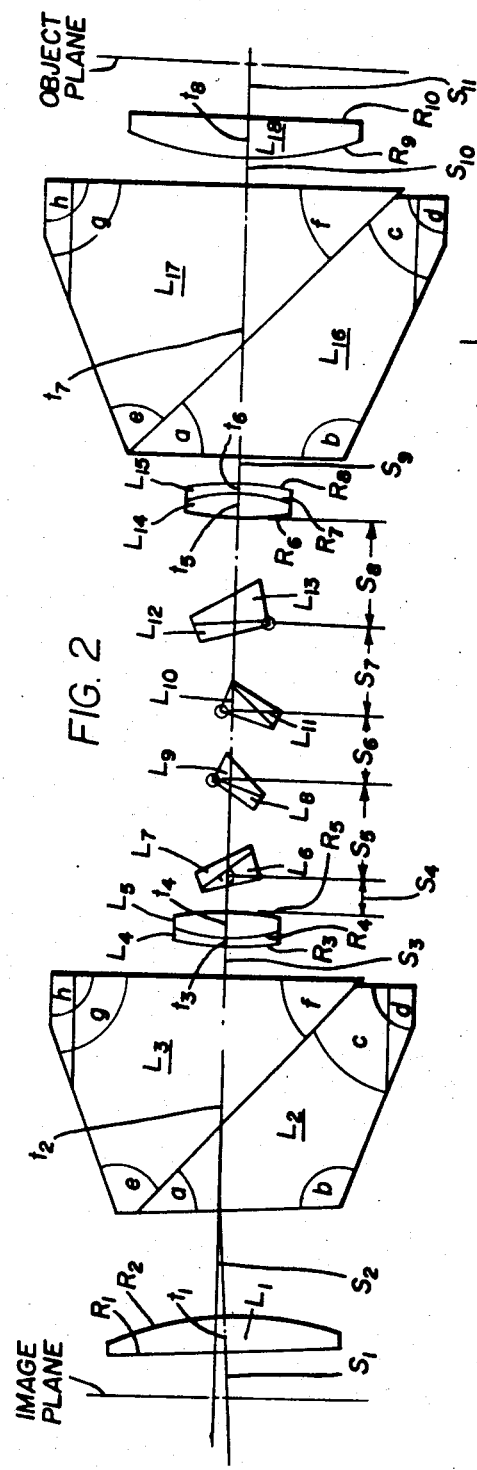
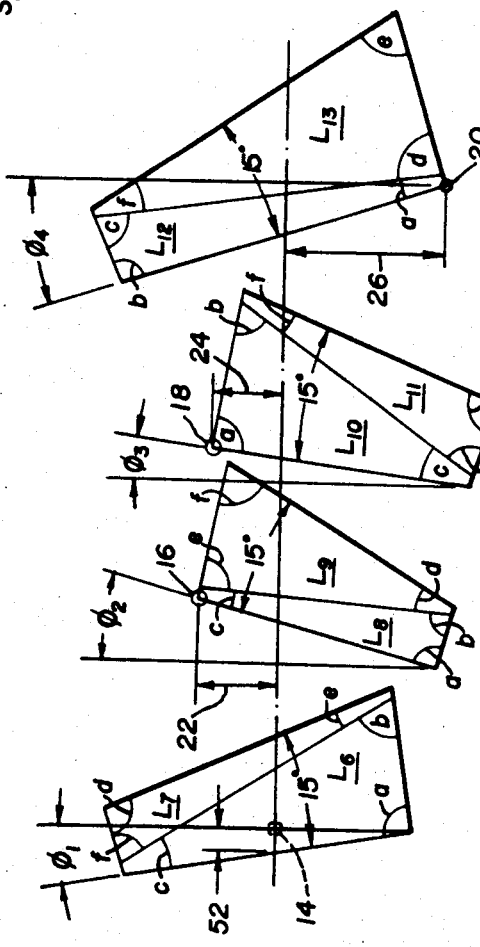
FIG. 2
FIG. 3
JOSEPH H. OBERHEUSER
INVENTOR.
BY *Frank C. Parker*
ATTORNEY

United States Patent Office 3,497,289
Patented Feb. 24, 1970

3,497,289
PRISM VARIABLE ANAMORPHIC OPTICAL SYSTEM
Joseph H. Oberheuser, West Brighton, N.Y., assignor to Bausch & Lomb Incorporated, Rochester, N.Y., a corporation of New York
Filed Sept. 25, 1967, Ser. No. 670,221
Int. Cl. G02b 13/10
U.S. Cl. 350—182                                          6 Claims

ABSTRACT OF THE DISCLOSURE

A continuously variable anamorphic system designed to be adapted to microscopes, said system being variable between the ranges of 1× to 2.2×. The basic optical system consists of a pair of field lenses, a pair of collimating lenses, four refracting compound prisms, and a pair of image inverting prisms all combined to produce the prism variable anamorphic optical system.

Background of the invention

This invention relates generally to an anamorphic optical system and more particularly relates to a continuously variable prism anamorphic optical system designed for use in a microscope or the like.

Heretofore, anamorphic optical systems have been generally utilized with cinematographic equipment used to project wide angle motion pictures on a motion picture screen. For example, Patent No. 2,995,066, issued to Georges Duffresses on Apr. 8, 1961, discloses such a use of an anamorphic optical system. This system, utilizes lenses and mirrors to achieve the anamorphism necessary to compress the width of the motion picture image while holding the height constant.

Another typical use of an anamorphic optical system is shown in the Patent 2,798,411, issued July 9, 1957 to Kenneth Coleman. Here the inventor utilizes known optical components, such as prisms, located at right angles to each other to achieve his anamorphic optical system. A system such as this again is adaptable to be used with photographic equipment and wide screen projection and the like but due to the particular size and arrangement of the components is not easily adaptable to use on a microscope.

An anamorphic optical system designed for a microscope must, of necessity, be compact and require essentially no modification to the microscope in order to adapt it to use with the microscope. In addition, such an eyepiece system must be easily and quickly interchangeable with the standard eyepieces as used on the microscope. And, finally, such an anamorphic system should provide a continuously variable anamorphism in any desired direction with an erect image and no loss of field.

Summary of the invention

Accordingly, the anamorphic optical system of my invention comprises a pair of identical field and collimating lenses with the prism anamorphic components placed therebetween. An image inverting prism of the Pechan type is placed between the pair of collimating and field lens to fold the optical path and to erect the image. This is accomplished by locating the Pechan prisms 90° relative to each other in the optical system.

In keeping with this summary, it is an object of this invention to provide a continuously variable anamorphic eyepiece system designed for a microscope, said system being compact and providing a continuously variable anamorphism over the range of 1× to 2.2×.

Another object of this invention is to provide a continuously variable anamorphic eyepiece system wherein the image is inverted and reverted by means of a pair of optical prisms spaced 90° relative to each other.

Yet another object is to provide a new and novel anamorphic optical system designed for a microscope or the like whereby the continuously variable anamorphism is achieved by means of a plurality of pivotal prisms, said prism being pivotal mechanically simultaeously through predetermined angles thereby providing the desired degree of anamorphism, said prisms also being rotatable 360° about the optical axis of the system.

These and other objects and advantages of my invention will become apparent from the following description when taken in conjunction with the accompanying drawings.

Brief description of the drawings

FIGURE 2 shows the arrangement of the anamorphic optical system in its operative plane;

FIGURE 3 shows the prism components of the anamorphic system showing the constructional data of the prisms;

Description of preferred embodiment

Figure 1:
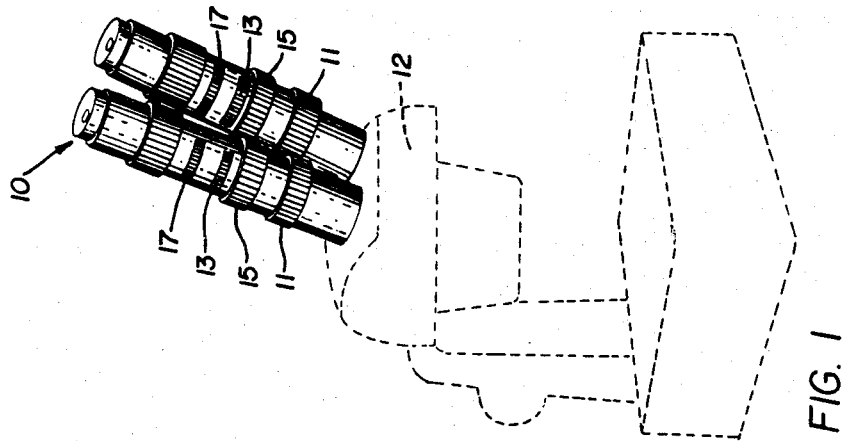
FIGURE 1 shows a general perspective view of the anamorphic eyepieces of my invention mounted on a microscope.

The anamorphic eyepiece optical system comprising my invention is shown in FIGURE 1 of the drawings and comprises eighteen optical elements, hereinafter numbered $L_1$ through $L_{18}$ respectively, said elements all being physically located within the eyepiece structure 10. The eyepiece structure 10 is mounted by means of a clamp ring 11 to a standard microscope 12, being interchangeable with the existing eyepiece mountings of the microscope 12·

The eyepiece structure 10 contains an azimuth control ring 13 for rotating the anamorphic direction of the optical system along with an azimuth lock ring 15 to lock the rotation of the optical components. Also included on the eyepiece structure 10 is a zoom control 17 for varying the magnification of the optical system within the design limits as will be hereinafter described.

Turning now to FIGURE 2, there is shown the arrangement of eighteen optical elements contained within the eyepiece structure 10. While the eighteen optical elements are shown in their operative plane in this figure, it should be noted at this time that the optical elements $L_{16}$ and $L_{17}$ are shown 90° out of their actual position for purposes of clarity in showing the critical angles necessary for constructional purposes. In actual practice, the elements $L_{16}$ and $L_{17}$ are positioned 90° around the optical path of the optical system relative to the optical elements $L_2$ and $L_3$.

The first optical element $L_1$ is a standard field lens as commonly utilized in optical systems and is fixedly mounted in front of an image inverting prism $L_2$, $L_3$. Immediately to the rear of the image inverting prism assembly $L_2$, $L_3$ is located the first collimating lens assembly $L_4$, $L_5$, also fixedly mounted in the optical system.

The next four optical assemblies of my system constitute the zoom prism assembly and consists of four pivotal anamorphic prisms, all being pivotly mounted in relationship to each other. Immediately after the anamorphic prisms, numbered respectively $L_6$–$L_{13}$ in FIGURE 2, is located the second collimating lens assembly $L_{14}$, $L_{15}$. This lens assembly is fixed in the optical system in a manner similar to the first collimating lens assembly $L_4$, $L_5$.

Located a fixed distance from the second collimating lens assembly $L_{14}$, $L_{15}$ is a second image inverting prism assembly $L_{16}$, $L_{17}$ fixedly mounted in the eyepiece structure 10. Completing the basic optical system is a second field lens $L_{18}$ fixedly attached to the eyepiece structure 10 at a given distance from the second prism assembly $L_{16}$ and $L_{17}$.

The constructional data for the lens elements of the basic optical system is given in the following Table I, wherein the letter S represents a distance from one lens element to another, the letter R represents a radius of the lens element, the letter $t$ represents the thickness of the lens element with reference being made to the figures of the drawings for directions of curvature.

TABLE I

| Element | Distances in mm. | Index | Abbé V |
|---|---|---|---|
| $L_1$ | $S_1=1.0$<br>$R_1=\infty$<br>$t_1=3.57$<br>$R_2=31.39$<br>$S_2=8.67$ | 1.517 | 64.5 |
| $L_4$ | $S_3=0.5$<br>$R_3=87.052$<br>$R_4=21.601$<br>$t_3=1.0$ | 1.617 | 36.6 |
| $L_5$ | $t_4=2.3$<br>$R_5=87.052$<br>$S_4=2.0$ | 1.617 | 54.9 |
| $L_{14}$ | $R_6=87.052$<br>$R_7=21.601$<br>$t_5=2.3$ | 1.617 | 54.9 |
| $L_{15}$ | $t_6=1.0$<br>$R_8=87.052$<br>$S_9=0.5$ | 1.617 | 36.6 |
| $L_{18}$ | $S_{10}=2.705$<br>$t_8=3.57$<br>$R_9=31.39$<br>$R_{10}=\infty$<br>$S_{11}=2.6$ | 1.517 | 6.5 |

The constructional data for the zoom prisms $L_6$, $L_7$, $L_8$, $L_9$, $L_{10}$, $L_{11}$, and $L_{12}$, $L_{13}$, is given in the following Table II wherein the angles $a$ through $f$ represent the internal angles of the respective prisms as shown in FIGURE 3 of the drawings:

TABLE II

| Element | Angle | Index | Abbé V |
|---|---|---|---|
| $L_6$ | $a=83°54'$<br>$b=69°27'$<br>$c=26°39'$ | 1.617 | 62.7 |
| $L_7$ | $d=90°0'$<br>$e=11°39'$<br>$f=78°21'$ | 1.613 | 31.3 |
| $L_8$ | $a=90°0'$<br>$b=78°21'$<br>$c=11°39'$ | 1.613 | 31.3 |
| $L_9$ | $d=26°39'$<br>$e=90°0'$<br>$f=63°21'$ | 1.617 | 62.7 |
| $L_{10}$ | $a=90°0'$<br>$b=76°0'$<br>$c=14°0'$ | 1.613 | 31.3 |
| $L_{11}$ | $d=61°0'$<br>$e=90°0'$<br>$f=29°0'$ | 1.617 | 62.7 |
| $L_{12}$ | $a=14°0'$<br>$b=90°0'$<br>$c=76°0'$ | 1.613 | 31.3 |
| $L_{13}$ | $d=70°0'$<br>$e=75°0'$<br>$f=29°0'$ | 1.617 | 62.7 |

The constructional data for the image inverting prisms $L_2$, $L_3$ and $L_{16}$, $L_{17}$, is given in the following table wherein the angles $a$–$h$ represent the internal angles of the respective prisms as shown in FIGURE 2 of the drawings:

TABLE III

| Element | Angle | Index | Abbé V |
|---|---|---|---|
| $L_2$ | $a=45°0'$<br>$b=112°30'$<br>$c=22°30'$<br>$d=90°0'$ | 1.541 | 59.9 |
| $L_3$ | $e=66°22'30''$<br>$f=47°15'$<br>$g=66°22'30''$<br>$h=90°0'$ | 1.541 | 59.9 |
| $L_{17}$ | $e=45°0'$<br>$f=112°30'$<br>$g=22°30'$<br>$h=90°0'$ | 1.562 | 51.0 |
| $L_{16}$ | $a=67°30'$<br>$b=45°0'$<br>$c=67°30'$<br>$d=90°30'$ | 1.562 | 51.0 |

Referring now to FIGURE 3 of the drawings, there is shown the zoom prisms of the optical system in their respective positions with the numerals 14, 16, 18 and 20 representing the respective pivot points of the prism assemblies $L_6L_7$, $L_8L_9$, $L_{10}L_{11}$, and $L_{12}L_{13}$. It will be observed from FIGURE 3 that the first prism assembly $L_6L_7$ has its pivot point on the optical axis of the eyepiece system whereas the second prism assembly $L_8L_9$ has its pivot point disposed the distance shown as numeral 22 in FIGURE 3. This distance 22 has been found from analysis to be substantially 1.74 units in respect to the other zoom prism assemblies in order to obtain the optimum system.

Similarly, the pivot point of the prism assembly $L_{10}$, $L_{11}$ is located in the same plane as that of the element $L_8L_9$ and disposed above the optical axis of the system the distance shown as numeral 24 in the FIGURE 3. From analysis, it has been found that this distance should be substantially 1.54 units in order to achieve the optical properties necessary for the proper functioning of the optical system. The pivot point of the prism assembly $L_{12}L_{13}$, it will be observed, is located in the same plane as the three other prism assemblies of the zoom system but is located the distance shown by the numeral 26 below the optical path of the system. This distance 26 has been found from analysis to be ideally in the neighborhood of 3.86 uits.

The constructional data for the axial relationship of the zoom prisms is shown in FIGURE 2 by the distances $S_4$, $S_5$, $S_6$, $S_7$ and $S_8$ wherein the distance $S_4$ represents the horizontal distance from the face of the lens element $L_5$ to the pivot point of the prism assembly element $L_6L_7$ with $S_5$ representing the horizontal distance from the pivot point of the prism assembly element $L_6L_7$ to the pivot point of the prism assembly $L_8L_9$. This distance $S_6$ represents the horizontal distance from the prism assembly $L_{10}L_{11}$ to the pivot point of the prism assembly $L_{12}L_{13}$. The distance $S_8$ in FIGURE 2 represents the horizontal distance from the pivot point of the prism assembly $L_{12}L_{13}$ to the face of the lens element $L_{14}$. The proper relationship of the distances $S_4$, $S_5$, $S_6$, $S_7$ and $S_8$ to each other are respectively 2.0 units, 6.26 units, 3.50 units, 5.98 units and 4.74 units. When the zoom prism assemblies are positioned for a magnification of 2.2×, the distance, shown as the numeral 52, from the face of the prism element $L_6$ to the pivot point 14 of the prism assembly $L_6L_7$ has been found to be ideally 1 unit.

It should be noted at this point that the distance relationship of the pivot points of the zoom prism assemblies to the optical axis of the system and to each other has been given in units since the actual distance for $S_4$, $S_5$, $S_6$, $S_7$, $S_8$, 22, 24 and 26 shown in FIGS. 2 and 3 is determined by the particular installation. For example, in the microscope application described, the units would be in millimeters while a different application of my anamorphic system may dictate other units resulting in a similar anamorphic system as long as the ratio of the units, as to each other, remains constant.

FIGURE 3 also shows the respective angles $\phi_1$–$\phi_4$ through which the zoom prism assemblies are simultaneously pivoted in order to achieve a magnification ranging from 1× to 2.2×. The constructional data for the variation in the angles $\phi_1$–$\phi_4$ is given in the following Table IV wherein M represents the magnification, $\phi_1$–$\phi_4$ representing respectively the rotation angle of prism assemblies $L_6L_7$, $L_8L_9$, $L_{10}L_{11}$, and $L_{12}L_{13}$ and to achieve the magnification M, $\phi_1$ and $\phi_4$ being rotated clockwise and $\phi_2$ and $\phi_3$ being rotated counter-clockwise with a change in sign representing a rotation of the prism angle past the vertical or zero prism angle:

TABLE IV

| M | $\phi_1$ | $\phi_2$ | $\phi_3$ | $\phi_4$ |
|---|---|---|---|---|
| 2.200 | −16.75° | 28.35° | 16.75° | −28.35° |
| 1.938 | −13.75° | 24.8° | 13.75° | −24.8° |
| 1.600 | −7.75° | 18.0° | 7.75° | −18.0° |
| 1.242 | 1.25° | 8.75° | −1.25° | −8.75° |
| 1.000 | 13.25° | −3.25° | −13.25° | 3.25° |

Figure 5:
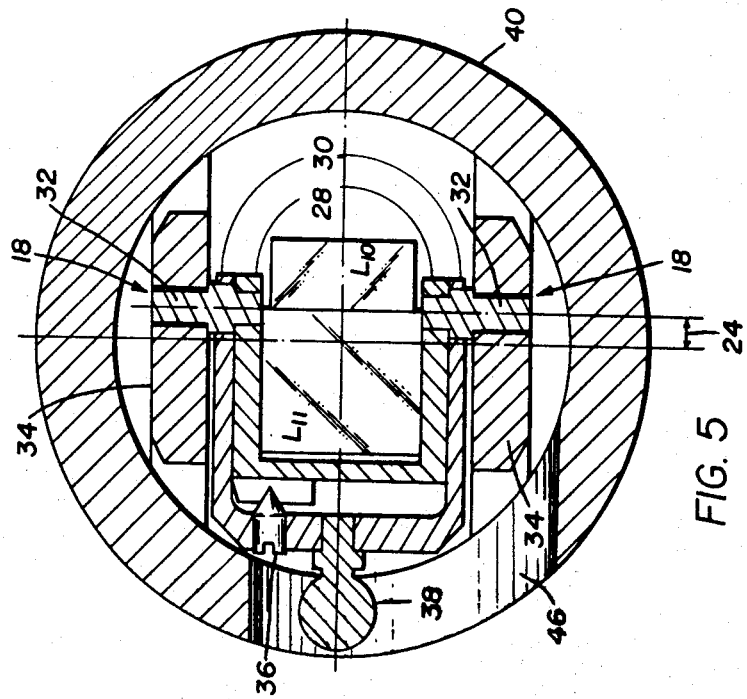
FIGURE 5 is a sectional view of the pivot means taken along line 5—5 of FIGURE 4.
Figure 4:
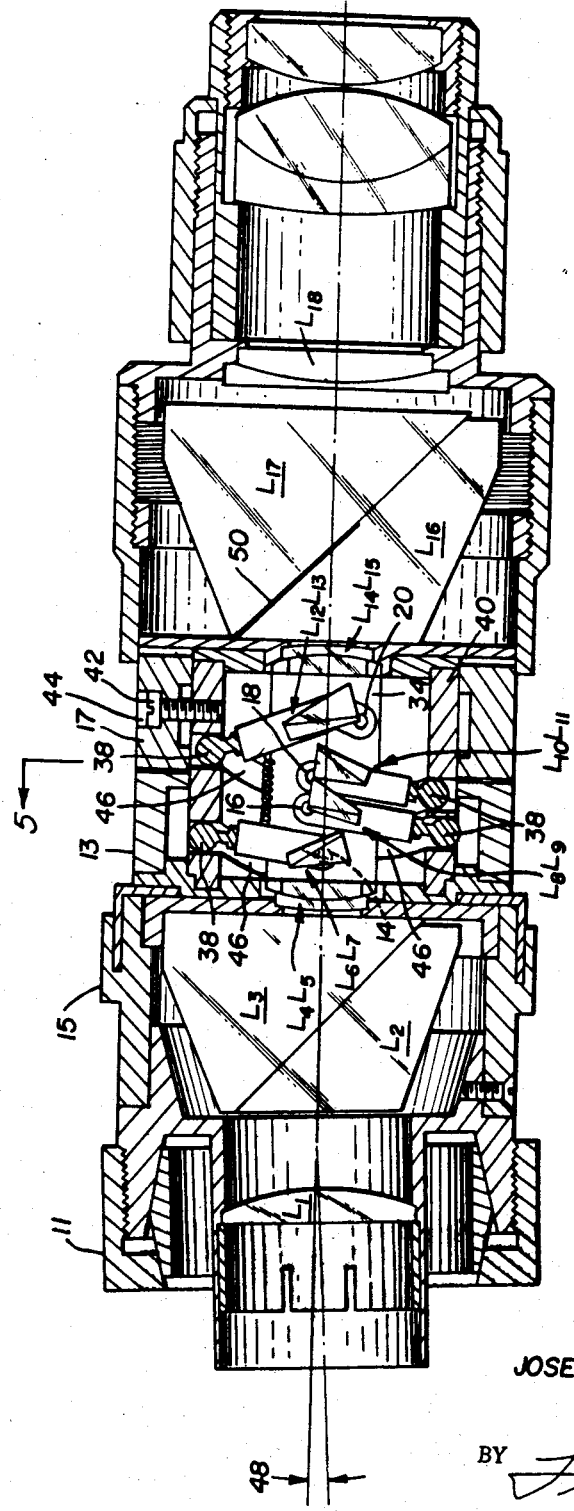
FIGURE 4 is a sectional view of the variable anamorphic eyepiece system showing the location of the various components, the mounting of the components and the means for pivoting the components.

Referring now to FIGURES 4 and 5 there are shown sectional views of the variable anamorphic eyepiece system of my invention illustrating the means whereby the compound prisms, $L_6L_7$, $L_8L_9$, $L_{10}L_{11}$, and $L_{12}L_{13}$, may be pivotably rotated simultaneously about their individual pivot points. The prism assemblies are rigidly fastened by well known means to a U-shaped member 28, held by second U-shaped member 30. Rigidly fastened to the first U-shaped member 28 and through the second U-shaped member 30 are a pair of bearing shafts 32 journalled in the frame member 34. The frame member 34 is rigidly attached to the azimuth control ring 13 in such a manner that rotation of the azimuth control ring 13 in turn rotates the frame member 34 around the optical axis of the eyepiece system.

The pair of bearing shafts 32 act as the pivot points for the respective prisms and are located at an appropriate distance from the optical axis as heretofore disclosed. For example, the sectional view shown in FIGURE 5 illustrates the prism assembly $L_{10}L_{11}$. By referring to FIGURE 3, it can be seen that the pivot point 18 for this prism assembly is located the distance shown by the numeral 24 above the optical axis of the system. From this it can be seen, by returning to FIGURE 5 that the bearing shafts 32 which form the pivot points 18 are located the distance 24 above the optical axis of the system.

Minor adjustments in the relationship between the first U-shaped member 28 and the second U-shaped member 30 are made by means of the set screw 36, contained in the drilled and tapped hole in the lower portion of the second U-shaped member 30. After the first and second U-shaped members 28 and 30 are properly positioned in relationship to each other, the set screw 36 may be tightened, thereby causing the U-shaped members to be fixedly attached together and thus allowing them to rotate as a unit.

The second U-shaped member 30 also contains on its lower portion a ball member 38 which acts as a cam follower as hereinafter described. Surrounding the refracting compound prisms $L_6L_7$, $L_8L_9$, $L_{10}L_{11}$ and $L_{12}L_{13}$ is a cylindrical sleeve member 40 which is rigidly fastened to the zoom control 17 by means of a screw 42 contained in a recessed hole 44 on the zoom control 17.

The cylindrical sleeve member 40 has formed thereon a plurality of cam slots 46 which act in cooperation with the ball member 38 and serve as the means whereby the prism assemblies may be simultaneously pivoted upon rotation of the zoom control 17.

The cam slots 46 are formed on the cylindrical sleeve member 40 in a manner well known in the art to cause the prism assemblies to simultaneously pivot about their respective pivot points through the angles as shown in the heretofore described Table IV.

From the above, it can be seen that the rotation of the zoom control 17 causes the cylindrical sleeve member 40 to rotate, which in turn causes the respective refractive compound prism assemblies to pivot by well known cam and linkage means. Also from the above, it can be seen that a rotation of the azimuth control ring 13 causes a rotation of the frame member 34 about the optical axis of the system. This latter rotation, in turn, causes the four prism assemblies to be rotated about the optical axis of the system thereby allowing the direction of the anamorphism to be changed.

It will be noted in FIGURE 4 that the exit beam of the first prism assembly, $L_2L_3$, deviates the optical axis of the system, from the horizontal, by the angle shown as numeral 48 in FIGURE 4. It has been found from analysis that this angle should be substantially 2 degrees, 15 minutes in order to allow for proper eyepiece adjustment to maintain proper inter-pupillary distance.

Completing the optical system, it will be noted that a mask 50 has been interposed between the prism $L_{16}$ and $L_{17}$. This mask was inserted into the optical system at this point in order to prevent stray light, from within the prism assembly $L_{16}$, $L_{17}$, from having an adverse effect on the optical system.

From the foregoing, it will be seen that I have provided new and novel means for accomplishing all of the objects and advantages of the invention. Nevertheless, it is apparent that many changes in the details of discussion, arrangement of parts or steps in the process may be made without departing from the spirit and scope of the invention.

I claim:
1. An anamorphic optical system for modifying the cross-sectional configuration of a beam of light, said system comprising in combination,
   (a) a housing structure,
   (b) a first field lens, $L_1$, fixedly attached to said structure,
   (c) a first image inverting prism assembly, $L_2L_3$, fixedly attached to said structure,
   (d) a first collimating lens assembly, $L_4L_5$, fixedly attached to said structure,
   (e) four pivotal refracting compound prisms $L_6L_7$, $L_8L_9$, $L_{10}L_{11}$, and $L_{12}L_{13}$, of the anamorphic type having their active planes parallel which are pivotably attached to said structure,
   (f) means, operatively constructed, whereby said compound prisms may be simultaneously pivoted about their individual pivot points in a predetermined manner,
   (g) a second collimating lens assembly $L_{14}L_{15}$, fixedly attached to said structure,
   (h) a second image inverting prism assembly $L_{16}L_{17}$, fixedly attached to said structure and orientated substantially 90° radially about the optical axis of the system in relationship to the orientation of the first prism assembly $L_2L_3$, and
   (i) a second field lens $L_{18}$ fixedly attached to said structure.

2. The optical system as defined in claim 1 and further characterized by the apices of the two inner prisms $L_8L_9$ and $L_{10}L_{11}$ pointing in the same direction as one another with the apex of the prismatic air space therebetween pointing in the opposite direction.

3. The optical system as defined in claim 2 and further characterized by the apices of the two outer prisms $L_6L_7$ and $L_{12}L_{13}$ pointing in the same direction as the apex of the prismatic air space between the two inner prisms $L_8L_9$ and $L_{10}L_{11}$.

4. The optical system as defined in claim 3 and further characterized by the pivot points of the two outer prisms $L_6L_7$ and $L_{12}L_{13}$ being located substantially on the optical axis of the system and substantially 3.86 units therefrom respectively, with the pivot points of the two inner prisms $L_8L_9$ and $L_{10}L_{11}$ being located substantially 1.74 units and substantially 1.54 units respectively from the optical axis of the system.

5. The optical system as defined in claim 4 and further characterized by the pivot points of the refracting prisms $L_8L_9$, $L_{10}L_{11}$, $L_{12}L_{13}$ being located axially along the optical axis of the optical system the distances, a distance from the refracting prism $L_6L_7$, substantially of 6.26 units, 3.50 units and 5.98 units respectively.

6. In a prism type anamorphic zoom optical system for modifying the cross-sectional configuration of a beam of light, said system being of the type comprising a pair of field lenses $L_1$ and $L_{18}$, a pair of prisms $L_2L_3$ and $L_{16}L_{17}$, a pair of collimating lens assemblies $L_4L_5$ and $L_{14}L_{15}$ and four refracting compound prisms $L_6L_7$, $L_8L_9$, $L_{10}L_{11}$, and $L_{12}L_{13}$, said compound prisms being pivotally rotated about their individual pivot points through the angle $\phi$, the improvement comprising a continuously variable prism anamorphic zoom system of the constructional data set forth in the following table wherein M represents the magnification, $\phi_1$ through $\phi_4$ represents respectively the rotation angle of prisms $L_6L_7$, $L_8L_9$, $L_{10}L_{11}$, and $L_{12}L_{13}$ to achieve the magnification M, $\phi_1$ and $\phi_4$ being rotated clockwise and $\phi_2$ and $\phi_3$ being rotated counterclockwise with a change in sign representing a rotation of the prism angle $\phi$ past the vertical or zero-prism angle:

| M | $\phi_1$ | $\phi_2$ | $\phi_3$ | $\phi_4$ |
|---|---|---|---|---|
| 2.2 | −16.75° | 28.35° | 16.75° | −28.35° |
| 1.938 | −13.75° | 24.8° | 13.75° | −24.8° |
| 1.6 | −7.75° | 18.0° | 7.75° | −18.0° |
| 1.242 | 1.25° | 8.75° | −1.25° | −8.75° |
| 1.0 | 13.25° | −3.25° | −13.25° | 3.25° | the apices of the two inner prisms $L_8L_9$ and $L_{10}L_{11}$ pointing in the same direction as one another with the apex of the prismatic air space therebetween pointing in the opposite direction, and the apices of the two outer prisms $L_6L_7$ and $L_{12}L_{13}$ pointing in the same direction as the apex of the prismatic air space between the two inner prisms $L_8L_9$ and $L_{10}L_{11}$.

References Cited

UNITED STATES PATENTS 2,828,670  4/1958  Luboshez _____ 350—185
3,410,629  11/1968  Carpenter et al. _____ 350—181

JOHN K. CORBIN, Primary Examiner

U.S. Cl. X.R.
350—185, 203, 287